United States Patent
Hesselmans et al.

(10) Patent No.: US 6,893,683 B1
(45) Date of Patent: May 17, 2005

(54) PROCESS FOR THE PREPARATION OF A COATING, A COATED SUBSTRATE, AN ADHESIVE, A FILM OR SHEET

(75) Inventors: Laurentius Cornelius Josephus Hesselmans, '-Hertogenbosch (NL); Dirk Pieter Spek, Meeuwen (NL)

(73) Assignee: Stahl International B.V., Waalwijk (NL)

( * ) Notice: Subject to any disclaimer, the term of this patent is extended or adjusted under 35 U.S.C. 154(b) by 218 days.

(21) Appl. No.: 10/089,423

(22) PCT Filed: Sep. 29, 2000

(86) PCT No.: PCT/NL00/00699
§ 371 (c)(1),
(2), (4) Date: May 22, 2002

(87) PCT Pub. No.: WO01/23451
PCT Pub. Date: Apr. 5, 2001

(30) Foreign Application Priority Data

Sep. 30, 1999 (NL) .............................. 1013179

(51) Int. Cl.⁷ ................................ B05D 3/02
(52) U.S. Cl. ................................ 427/385.5
(58) Field of Search ...................... 427/385.5

(56) References Cited

U.S. PATENT DOCUMENTS

| 3,014,009 A | * 12/1961 | Levine ................ 528/123 |
| 4,552,913 A | 11/1985 | Wolfe et al. |
| 4,912,152 A | 3/1990 | Nejigaki et al. |

FOREIGN PATENT DOCUMENTS

| EP | 0171015 A2 | | 12/1986 |
| GB | 976240 | * | 11/1964 |
| JP | 09-067466 | * | 3/1997 |
| WO | WO 97/19124 | * | 5/1997 |

* cited by examiner

Primary Examiner—Erma Cameron
(74) Attorney, Agent, or Firm—Peacock Myers & Adams PC

(57) ABSTRACT

The invention comprises a process for the preparation of a coating, adhesive, film or sheet. In this process a mixture of a polyisocyanate functional, a polyepoxide functional, a polyanhydride functional or a polyketone functional compound or polymer and a compound containing reactive hydrogen, in which the compound containing reactive hydrogen is used in a material which is non-reactive towards the compound containing reactive hydrogen which mixture is not or low reactive at ambient conditions and high reactive under selected conditions, is applied onto a substrate at ambient temperature, followed by reacting the above compounds at elevated temperatures. At ambient temperature said compound containing reactive hydrogen is a solid material, a powder, a granule, a flake or grind or a mixture thereof which is preferably ground. The invention comprises further the coating mixtures to be used in the process and the coatings, coated substrates, adhesives, films, sheets, impregnated substrates, synthetic leathers, inmould coatings, coated leathers, coated polyvinylchlorides, coated non-wovens, coated coagulated polyurethane substrates, breathable coated substrates, obtained by applying the process.

18 Claims, No Drawings

PROCESS FOR THE PREPARATION OF A COATING, A COATED SUBSTRATE, AN ADHESIVE, A FILM OR SHEET

The present invention relates to a process to prepare a coating, adhesive, film or sheet, of the thus obtained products and to the coating mixture to be used in the process.

Several methods have been developed for high solids or solvent free application in the polyurethane industry to prepare coatings or films.

One approach is the reaction of a polyisocyanate or of a isocyanate functional polyurethane prepolymer with a polyol at 160–180° C. In this way flexible coatings can be prepared with a medium strength. A disadvantage of this method is that the potlife of the mixture is limited to about 3 hours.

Further, while a reaction within 2 to 3 min is required, there is only a partial reaction within that time and a post reaction takes place between the unreacted components during storage at ambient temperature. As a consequence the coatings are sometimes tacky immediately after the curing and for example a coated piece of textile cannot be rolled up.

A second approach is the reaction between a blocked polyisocyanate and a polyamine or polyol. Especially with polyamines strong films can be obtained. When the blocking agent is a ketoxime, such as butanone oxime, it will evaporate during the reaction, but usually some of the butanone oxime will stay in the film. The result is that, also after application, their may be toxic vapours and the coating smells. Other types of blocking agents, such as dimethylpyrazole and triazole types, malonic esters or acetoacetates, and ε-caprolactams need a long deblocking time and they will partially stay in the coating as not-polymerized molecules. Also in these cases the coatings smell.

A further possibility is the combination of a polyisocyanate and a polyamine from which the amine functions are deactivated by the reaction with a maleic ester under formation of a aspartate. In spite of the deactivation of the amine functions the combination with a polyisocyanate will have a too limited potlife.

An alternative method is the use of internally blocked polyisocyanates which act as crosslinkers mainly in powder coatings. In this method an incorporated uretdion acts as internal blocking agent. At prolonged heating the uretdion unblocks under formation of two isocyanate functions, which further react with a material containing reactive hydrogen. The curing time at 180° C. is at least 15 min, which is an unacceptable long time for our applications.

All these systems have some negative aspects such as a to short potlife, a to long reaction time and the evaporation of toxic vapours. We have overcome the described problems and have now developed a new process to prepare a coating, adhesive, film or sheet by a heat curable system.

DESCRIPTION OF THE INVENTION

According to the present invention there is provided a process for the preparation of a coating, adhesive, film or sheet, characterized in that a mixture of a polyisocyanate functional, a polyepoxide functional, a polyanhydride functional or a polyketone functional compound or polymer and a compound containing reactive hydrogen, in which the compound containing reactive hydrogen is dispersed in a material which is non-reactive towards the compound containing reactive hydrogen, which mixture is not or low reactive at ambient conditions and high reactive under selected conditions, is applied onto a substrate at ambient temperature, followed by reacting the above compounds at elevated temperatures.

Surprisingly, the technical problems known in the art are solved and coatings, adhesives, films or sheet are obtained in an easy way by the proces of the invention. Surprisingly, it further appeared that the potlife of the coating mixtures of the invention is relatively long, the reaction is relatively fast and no toxic vapours are evaporated from the obtained products.

Since the material containing reactive hydrogen is not or low reactive at ambient temperature towards a polyisocyanate functional, a polyepoxide functional, a polyanhydride functional, or a poly ketone functional compound or polymer such mixtures will have a long pot-life, which is a great advantage in the process. This means, at ambient temperature, such a mixture will be stable for at least 1 day. Several of the compounds containing reactive hydrogen are that inert in a polyketone, polyepoxide or polyanhydride functional compound or polymer that the mixtures are stable as a one pot system.

The material containing reactive hydrogen, is not or low-reactive at ambient temperature because under these conditions the mixture of the isocyanate functional material and the material containing reactive hydrogen form a two phase system, which means it is a heterogeneous sytem. In the two phase sytem the compound containing reactive hydrogen is present in the mixture as a solid, a powder, a granule, a flake or a grind or a mixture thereof. The material is preferably ground to obtain a greater reactive area.

The compound containing reactive hydrogen is preferably dispersed in a second material, which material is non-reactive towards said compound containing reactive hydrogen, and not or low reactive towards the isocyanate functional-, the epoxide functional-, the anhydride functional- or the ketone functional compound or polymer at ambient temperature before the desired reaction is effected.

Such a dispersion is obtained by dispersing the material containing reactive hydrogen, in the second material by conventional methods which may be by a for example a disperser or a pearl mill. By dispersing the compound containing reactive hydrogen in an inert material a smaller particle size and a greater area can be obtained than when the pure solid is ground.

The compound containing reactive hydrogen reacts fast with a polyisocyanate functional, a polyepoxide functional, a polyanhydride, or a polyketone functional compound or polymer under selected conditions. Such a condition may be a sudden increase of temperature. At that moment the material containing reactive hydrogen will melt or dissolve in the system, the reactive sites of the molecules can move freely, and while the mixture is homogenised by diffusion, the reaction with the polyisocyanate functional, the polyepoxide functional, the polyanhydride functional, or the polyketone functional compound or polymer occurs.

The homogenisation at higher temperatures will be more efficient and as a result the reaction will be faster and more complete. Moreover, the performance of the films or coatings will be better when the particle size of the material containing reactive hydrogen, is small.

An excellent film or coating quality is obtained when the particle size is between 0,5 and 200 µm. A more preferable particle size is between 0,5 and 60 µm and the most preferable size is between 0,5 and 15 µm.

To obtain a maximal potlife, the material containing reactive hydrogen may not melt or soften in the reaction mixture at ambient temperature.

Several types of material containing reactive hydrogen may be used in the process such as polyhydrazides, polysemicarbazides, polysulphonyl hydrazides, carbohydrazide, guanidine or guanidine salts, polyamines or polyamine salts.

Said polyhydrazide which may be used in the process of the invention may be oxalic dihydrazide, malonic dihydrazide, succinic dihydrazide, adipic dihydrazide, sebacic dihydrazide, dodecanoic dihydrazide, isophthalic dihydrazide, piperazine N,N'-dihydrazide, m-benzene-dihydrazide, p-benzene-dihydrazide.

Preferably adipic dihydrazide and carbodihydrazide are used since they are inert in the reaction mixtures with an epoxide functional-, an anhydride functional- or a ketone functional compound or polymer at ambient temperature for at least one year. They further reacts instantaneously with a polyisocyanate, a polyepoxide, a polyanhydride or a polyketone functional compound or polymer at temperatures of 80–180° C. or higher.

A polysemicarbazide which may be used in the process of the invention is selected from ethane-disemicarbazide, butane-disemicarbazide, propane-disemicarbazide, hexane-disemicarbazide, para-benzene-disemicarbazide, toluene-2,4-disemicarbazide, toluene-2,4-disemicarbazide, bis (4-semicarbazido-phenyl)ether, bis (4,4'-hydrazido)-3,3'-dimethoxy biphenyl, di-N,N'-methylamino urea, 4,4'-methylene-bis (cyclohexene semicarbazide), 3-semicarbazidomethyl-3,5,5-trimethylcyclohexyl-semicarbazide or mixtures thereof.

A polysulphonylhydrazide which may be used in the process of the invention is selected from p,p'-oxybis benzene sulphonyl hydrazide; bis(methylhydrazido)sulphate, bis (methylhydrazidosulphonyl)piperazine, or bis p-(hydrazidosulphonylamino)benzene.

Usually, guanidine hydrochloride, guanidine acetate, guanidine carbonate and guanidine nitrate are suitable a guanidine salts.

A suitable polyamine or polyamine salt may be piperazine, piperazine diacetate, piperazine dihydrochloride, lysine, lysine hydrate, diaminoisophorone diacetate, diaminoisophorone dihydrochloride.

As mentioned before it is preferable when the compound containing reactive hydrogen is used as a dispersion in a material which is inert to both the reactive hydrogen compound and the second reagent of the reaction. This material is preferably a polyether, a polyester, a polycarbonate, a polyacrylate, a polyvinylalkylether, a polyurethane, optionally substituted by substituents which are non reactive towards the material containing reactive hydrogen, and non- or low reactive towards the isocyanate functional material or is a plasticizer of the group of phthalic alkylesters, adipic alkyl esters, sebacic alkyl esters, dodecanoic alkyl esters, polyesters, phosphate esters, fatty esters, straight and modified natural or mineral oils, sulphonated oils, ethoxylated oils, epoxidised oils, fatty acids, sulphon amides, fat liquors, lecithine or a mixture thereof, optionally mixed with water.

An important aspect of the invention is that a low solvent level can be used during the process, and most preferably the process is solvent free.

In the process of the invention a polyisocyanate functional compound or polymer, a polyketone functional compound or polymer, a polyepoxide functional compound or polymer, or a polyanhydride functional compound or polymer and the material containing reactive hydrogen are mixed together in an stoichiometric ratio of 0.5 to 1.5, and preferably in a ratio of 0.9 to 1,2, whereafter the obtained mixture is applied onto a substrate and the covered or impregnated substrate is heated to a temperature of 50 to 300° C. for 1–20 min and preferably to 80 to 200° C. for 1 to 10 min.

Surprisingly it appeared that the reaction takes place as well when the polyisocyanate functional compound or polymer and the material containing reactive hydrogen are mixed together in a stoichiometric ratio of 0.5–1.5 and preferably in a ratio of 0.9–1.1 whereafter the obtained mixture is applied onto a substrate and the covered or impregnated substrate is immersed into water of 20 to 100° C. for 0.5 to 10 min.

The isocyanate functional compound or polymer which is used in the process of the invention is usually a polyisocyanate or a isocyanate-functional polyurethane prepolymer.

Urea functions are formed by the reaction of the isocyanate functions and the $NH_2$-functions of the material containing reactive hydrogen.

The ketone functional compound or polymer of the invention is preferably a ketone functional polymer polyurethane with in-chain, pendant and/or terminal ketone functions. Ketimine functions are formed by the reaction of the ketone and the $NH_2$-functions of the material containing reactive hydrogen.

The anhydride functional compound of the invention is usually a polyanhydride or a copolymer containing anhydride functions. Amide functions are formed by the reaction of the anhydride function and the $NH_2$-functions of the the material containing reactive hydrogen.

The epoxide functional compound of the invention is usually a polyepoxide or a epoxy functional polymer. The epoxide rings are opened during the reaction with the $NH_2$-functions of the material containing reactive hydrogen and secundairy ore tertiary amines are formed.

A further part of the invention are the coatings, coated substrates, adhesives, films, sheets, impregnated substrates, synthetic leathers, inmould coatings, coated leathers, coated polyvinylchlorides, coated non-wovens, coated coagulated polyurethane substrates, breathable coated substrates which are obtained by the process of the invention.

The thus obtained films or coatings are strong, dry, flexible and UV-resistant.

The process and application results of the present invention are profitable regarding to conventional heat curable systems which are low-solvent or solvent-free. Regarding to the system in which a polyisocyanate functional compound or polymer reacts with a polyol the mixture of the present invention has a longer pot life, while the reaction is faster, almost instantaneous, and more complete at elevated temperatures. The obtained films or coatings are stronger because in the process of the invention urea functions are formed by the reaction of the isocyanate function and the amine or hydrazide, while in the reaction of a isocyanate and a OH-function a urethane function is formed. It is wellknown that an urea function gives additional strength because of the presence of hydrogen at the N of the urea function which makes it possible to form hydrogen bridges.

Regarding to the systems in which blocked isocyanates are used in combination with polyamines films or coatings of comparable strength are formed by the process of the invention, but the elongation and the tension at break is larger. The potlife of the mixture of the present invention is longer, there are no evaporating toxic reactants such as butanone oxime, or remaining low molecular material such as dimethylpyrazole and triazole types, malonic esters or acetoacetates and the resulting films or coatings do not smell. As a consequence the process of the invention will not have any damaging effect on the environment.

Regarding to the systems in which a polyisocyanate is reacted with a polyamine from which the amine functions are deactivated by the reaction with a maleic ester under formation of a aspartate, the mixtures of the process of the invention have a much longer potlife.

Regarding to the system in which an incorporated uretdion acts as internal blocking agent the reaction time is much shorter at elevated temperatures.

Finally the invention provides a coating mixture comprising on the one side a isocyanatefunctional compound, a polyepoxide functional compound, a polyanhydride functional compound, or a polyketone functional compound and on the other side a compound containing a reactive hydrogen which is not or low reactive at ambient temperature and highly reactive under selected conditions, which coating mixture is applied in the process of the present invention.

The coating mixture of the invention is stable at ambient temperature for at least one day and preferably the coating mixture of the epoxide functional-, the anhydride functional- or the ketone functional compound or polymer and the compound containing reactive hydrogen is stable at ambient temperature as a one pot system.

The compound containing reactive hydrogen is present in the mixture as a solid, a powder, a granule, a flake or a grind or a mixture thereof and is preferably ground.

As mentioned before it is preferable when the compound containing reactive hydrogen is used as a dispersion in a material which is inert to both the reactive hydrogen compound and the second reagent of the reaction.

The particle size of the ground or of the dispersion of the compound containing reactive hydrogen is from 0,5 to 200 $\mu$m, preferably from 0.5 to 60 $\mu$m and most preferably from 0.5 to 15 $\mu$m.

The mixtures of the isocyanate functional material and the material containing reactive hydrogen, may be applied onto a substrate. They may be used as films, sheets, in adhesives, sealants, printing ink and in coatings. They may be applied on any substrates, including leather or artificial leather, metals, wood, glass, plastics, paper, paper board, textile, non-woven, cloth, foam and the like by conventional methods, including spraying, flow-coating, reverse-coating, brushing, dipping, spreading and the like. The cured material may be further treated with coatings, such as a top-coat, or adhered to any sustrate by direct or transfer coating technics.

Many additives may be present for application reasons, for example fillers, colorants, pigments, silicons, fire retardants, matting agents, flow agents, foaming agents and the like.

Some applications where the process of the invention is used are of special interest.

For example, the process may be used for the preparation of a coated textile to be used as a synthetic leather. Such a process may comprise the preparation of an adhesion coat onto textile, followed by applying a mixture of a polyurethane prepolymer and a hydrazide-, semicarbazide-, amine or amine salt-dispersion of the invention onto the adhesion coat and curing of this mixture at an elevated temperature, which may be between 80 and 250° C. The coating may further be embossed at 80 to 250° C.

By repeating of the process described above on the backside of the textile a double sided coated textile may be obtained.

Alternatively the process may be used for the preparation of a coated substrate to be used as synthetic leather by transfer coating, which may comprise the preparation of a skincoat onto release paper, followed by the preparation of an intermediate coat by applying a mixture of a polyurethane prepolymer and a hydrazide-, semicarbazide-, amine or amine salt-dispersion of the invention onto the skincoat and curing of this mixture at an elevated temperature, which may be between 80 and 250° C., whereafter an adhesive coat is applyed onto the intermediate coat in which a piece of textile is laminated and the thus obtained material is dried, whereafter the release paper is removed.

The process described above may also be used for the preparation of for example coated leather, coated polyvinyl chloride, coated non-woven, coated coagulated polyurethane substrates.

Alternatively the process may be used for the preparation of a coated polyvinyl chloride to be used as synthetic leather by transfer coating, which may comprise the preparation of a skincoat onto release paper, followed by the preparation of an intermediate coat by applying a mixture of a polyurethane prepolymer and a hydrazide-, semicarbazide-, amine or amine salt-dispersion of the invention onto the skincoat and curing of this mixture at an elevated temperature, which may be between 80 and 250° C., whereafter a compact polyvinylchloride substrate onto the high solids coat is prepared by applying a polyvinylchloride paste onto the high-solids coat, optionally followed by laminating of a piece of textile into the polyvinylchloride paste, and curing of the polyvinyl chloride paste.

The process may further be used in the preparation of a moulded material by inmould coating which comprises spraying of a mixture of a polyurethane prepolymer and a hydrazide-, semicarbazide-, amine or amine salt-dispersion of the invention, and optionally a non-reactive solvent into a matrix untill a desired coating thickness is obtained. The matrix may be heated during the spray process, or after the spraying process. After the curing the moulded material may be removed.

Various aspects of the present invention are illustrated by the following examples. These examples are only illustrative of the invention and are not limiting the invention as claimed hereafter.

EXAMPLES

Example 1

Preparation of an aliphatic polyether based isocyanate functional polyurethane prepolymer.

Under a nitrogen atmosphere 112.78 g (507.56 mmole) of 3-isocyanatomethyl-3,5,5-trimethylcyclohexylisocyanate (hereafter refered to as IPDI) was added to a mixture of 139.21 g (138.24 mmole) of a polypropylene glycol with a molecular weight of 1007, 163.77 g (81.89 mmole) of a propylene glycol with a molecular weight of 2000 and 4.2 g (31.34 mmole) of trimethylol propane at 60–70° C. while stirring. The mixture was heated to 100° C. and reacted at this temperature for 2 hrs to form a polyurethane prepolymer. After 1 hr of reaction time 0.1 g of tinoctoate was added as a catalyst. The reaction mixture was cooled down. The amount of remaining NCO was measured and appeared to be 4.43%.

Example 2

Preparation of an aliphatic polyester based isocyanate functional polyurethane prepolymer.

Under a nitrogen atmosphere a 107.12 g (482 mmole) of IPDI was added to a mixture of 141.81 g (151.67 mmole) of a polyester diol with a molecular weight of 935 available from Occidental as Ruco S 1015-120, 166.83 g (55.61 mmole) of a polyesterdiol with a molecular weight of 3000 available from Occidental as Ruco S 1015-35 and 4.2 g (31.34 mmole) of trimethylol propane at 60–70° C. while stirring. The mixture was heated to 100° C. and reacted at this temperature for 2 hrs to form a polyurethane prepolymer. After 1 hr of reaction time 0.1 g of tinoctoate was added as a catalyst. The reaction mixture was cooled down. The amount of remaining NCO was measured and appeared to be 3.99%.

Example 3

Preparation of an aromatic polyether based isocyanate functional polyurethane prepolymer.

The procedure of example 1 was repeated with the exception that the IPDI was replaced by 88.31 g (507.56 mmole) of toluene diisocyanate (hereafter referred to as TDI) and the reaction was executed at 90–95° C. The NCO amount appeared to be 4.60.

Example 4

Preparation of an aromatic polyester based isocyanate functional polyurethane prepolymer.

The procedure of example 2 was repeated with the exception that the IPDI was replaced by 85.61 g (492 mmole) of TDI and the reaction was executed at 90–95° C. The NCO amount appeared to be 4.23%.

Example 5

Preparation of a ketone functional polyurethane polymer from a isocyanate functional polyurethane prepolymer and hydroxyacetone.

Under a nitrogen atmosphere a mixture of 100 g of the polyurethane prepolymer from example 1 and 7.81 g (105.48 mmole) of hydroxyacetone were heated to 100° C. The mixture was stirred for 2 hrs at 100° C. After 1 hr of reaction time 0.1 g of tinoctoate was added as a catalyst.

The disappearance of NCO was checked by IR-spectroscopy by following the NCO signal at 2269 $cm^{-1}$.

Example 6

Preparation of a ketone functional polyurethane polymer.

Under a nitrogen atmosphere 68.42 g (308 mmole) of IPDI was added to 251 g (171 mmole) of a ketone functional polyester diol obtainable from NeoResins as PEC 205 in 80 g of dipropylene glycole dimethyl ether at 60° C. while stirring. The mixture was heated to 100° C. and reacted at this temperature for 2 hrs to form a polyurethane prepolymer. After 1 hr of reaction time 0.1 g of tinoctoate was added as a catalyst. The reaction mixture was cooled down. The amount of remaining NCO was measured using a sample of 10 g, and appeared to be 2.71.

18.65 g (252 mmole)of methoxyethylamine was added to the obtained polyurethane prepolymer and the mixture was stirred for is min at 20° C. The disappearance of NCO was checked by IR-spectroscopy by following the NCO signal at 2269 $cm^{-1}$.

Example 7

Preparation of a ketone functional polyurethane polymer from a isocyanate functional isocyanurate and hydroxyacetone.

Under a nitrogen atmosphere a mixture of 151 g (259 mmole) N,N',N"-triisocyanatohexylisocyanurate and 57.50 g (777 mmole) of hydroxyacetone in 52.13 g of dipropylene glycol dimethyl ether were heated to 90° C. The mixture was stirred for 2 hrs at 90° C. After 1 hr of reaction time 0.1 g of tinoctoate was added as a catalyst. The disappearance of NCO was checked by IR-spectroscopy by following the NCO signal at 2269 $cm^{-1}$.

Example 8

Comparative example: preparation of a film from a MEK-oxime blocked polyurethane polymer and a amine functional crosslinker.

9.39 g (105.48 mmole) of mekoxime was added to 100 g of the prepolymer of example 1 at 60–65° C. The mixture was stirred for 2 hrs at 70° C. The disappearance of the NCO was checked by the absence of the NCO-signal in the Infrared spectrum at 2270 $cm^{-1}$. The product was cooled down and mixed with 12.47 g (52.4 mmole) of 3,3'-dimethyl-4,4'-diamino-dicyclohexyl-methan and 0.1 g of a 10% solution of dibutyltinlaureate in dipropylene glycol dimethyl ether as catalyst.

200 μm films were prepared and cured at 180° C. for 5 min.

Example 9

Comparative example: preparation of a film from a OH-functional polyurethane polymer and a NCO-crosslinker.

A: preparation of the OR-functional polyurethane polymer:

Under a nitrogen atmosphere 264 g (132 mmole) of a polypropyleneglycol with a molecular weight of 2000 and 7.92 (88 mmole) of 1,3-butanediol were heated to 80° C. 97.68 (440 mmole) of IPDI was added and the mixture was, stirred for 2 hrs at 100° C. After 1 hr of reaction time 0.1 g of tinoctoate was added as a catalyst. The reaction mixture was cooled down and the amount of remaining NCO in the resulting prepolymer was determined by titration and appeared to be 4.6%. 36.21 g (402 mmole) of 1,3-butanediol and 0.1 g of dibutyl tinlaureate were added and the mixture was heated to 100° for two hrs. The disappearance of the NCO was checked by the absence of the NCO-signal in the Infrared spectrum at 2270 $cm^{-1}$. The product was cooled down and had an OR-amount of 2.13 meq/g.

B: preparation of an NCO-crosslinker: 14.4 g (240 mmole) of n-propanol was added within 30 min to 102.2 gr (containing 600 mmole of NCO) of N,N',N"-triisocyanatohexylisocyanurate, whereafter the mixture was stirred and heated at 800 for 2 hrs. After 1 hr of reaction time 0.1 g of tinoctoate was added as a catalyst. The reaction mixture was cooled down and the amount of remaining NCO in the resulting polymer was determined by titration and appeared to be 12.0.

A 200 μm film was prepared from a mixture of 13 gr of the product of A and 9.2 g of the product of B with 0.05 g of a 10% solution of dibutyltinlaureate in dipropylene glycol dimethyl ether as catalyst. The film was cured for 5 min at 160° C.

Example 10

Preparation of a semicarbazide from 4,4'-methylene-bis (cyclohexylisocyanate) and hydrazine.

26.2 g (100 mmole) of 4,4'-ethylenebis (cyclohexylisocyanate) in 26.2 g of dipropylene glycol dimethyl ether was added to 12 g (240 mmole) of hydrazine hydrate in 18 g of isopropanol and 12 g of of dipropylene glycol dimethyl ether while keeping the temperature below 25° C. by cooling with ice. A white precipitate appeared. After stirring for 30 min the precipitate was filtered of and rinsed with dipropylene glycol dimethyl ether. The product was dried at 80° C. The yield was 44.42 g=88.9% from the theoretical amount.

Example 11

Preparation of a semicarbazide from hexamethylene diisocyanate and hydrazine.

33.6 g (200 mmole) of hexamethylenediisocyanate in 33.6 g of dipropylene glycol dimethyl ether was added to 24 g (480 mmole) of hydrazinehydrate in 27 g of isopropanol and 24 g of of dipropylene glycol dimethyl ether while keeping the temperature below 25° C. by cooling with ice. A white precipitate appeared. After stirring for 30 min the precipitate was filtered of and rinsed with dipropylene glycol dimethyl ether. The product was dried at 80° C. The yield was 41.95 g=84.9% from the theoretical amount.

Example 12

Preparation of a semicarbazide from a commercial mixture of toluene diisocynate and hydrazine.

34.8 g (200 mmole) of a commercial mixture of toluene diisocynate in 33.6 g of dipropylene glycol dimethyl ether was added to 24 g (480 mmole) of hydrazine hydrate in 24 g of isopropanol and 24 g of water while keeping the temperature below 25° C. by cooling with ice. A white precipitate appeared. After stirring for 30 min the precipitate was filtered of and rinsed with dipropylene glycol dimethyl ether. The product was dried at 80° C.

The yield was 34.78 g=69.3% from the theoretical amount.

Example 13

Preparation of a semicarbazide from 3-isocyanatomethyl-3,5,5-trimethylcyclohexylisocyanate and hydrazine.

44.4 g (200 mmole) of IPDI in 33.6 g of dipropylene glycol dimethyl ether was added to 24 g (480 mmole) of hydrazine hydrate in 24 g of isopropanol and 24 g of water while keeping the temperature below 25° C. by cooling with ice. The mixture was stirred for 1 hr and the solvents were evaporated. The mixture was cristalized from isopropanol.

Example 14

Preparation of a grind and of a dispersion of adipic dihydrazide.

Adipic dihydrazide was ground as a pure powder or it was ground in a 1:1 weight ratio in di(ethylhexyl) adipate in the presence of 0.5% of Triton X-100. By increasing the dispersioning time and the speed of the stirring blade smaller particle sizes could be obtained. The grinds and dispersions which were obtained are presented in Table I. The range of the particle size in the dispersions were measured by microscopy.

TABLE 1

Particle sizes of adipic dihydrazide in a pure grind or as a dispersion in di(ethylhexyl) adipate

| Example | medium | particle size of adipic dihydrazide in the medium (μm) Range |
|---|---|---|
| 14 A | Pure | 30–300 |
| 14 B | pure, ground | 30–250 |
| 14 C | di(ethylhexyl)adipate | 40–150 |
| 14 D | di(ethylhexyl)adipate | 30–60 |
| 14 E | di(ethylhexyl)adipate | 5–40 |
| 14 F | di(ethylhexyl)adipate | 0.5–13 |

Example 15

Preparation of a dispersion of adipic hydrazide in different liquid materials which are none non-reactive towards the adipic dihydrazide.

Adipic hydrazide was dispersed in a 1:1 weight ratio in liquid materials which were non-reactive towards the adipic dihydrazide in the presence of 0.5% of Triton X-100 by a Dispermat pearl mill configuration for 1.5 hrs at 5000 rpm. The range of the particle size in the dispersions depending on the medium were measured by microscopy. The results are presented in Table 2. The results show that the values for the particle size in a more polar medium are slighly less than in an apolar medium.

TABLE 2

Particle size of adipic dihydrazide as dispersion in several media

| Example | medium | particle size of adipic dihydrazide in the medium (μm) range |
|---|---|---|
| 15A | di(ethylhexyl)adipate | 30–60 |
| 15B | dibutyl phtalate | 30–60 |
| 15C | dioctyl phtalate | 30–60 |
| 15D | dibutyl sebacate | 30–60 |
| 15E | polyethylene glycol | 10–30 |
| 15F | tributoxyethylphosphate | 10–30 |
| 15G | soybean lecithin | 10–30 |
| 15H | castor oil | 10–30 |
| 15I | N-methyl pyrrolidone | 10–30 |
| 15J | dipropylene glycol dimethylether | 10–30 |

Example 16

Preparation of a dispersion of several dihydrazides, disemicarbazides, a di(sulphonylhydrazide), amine salts.

Several dihydrazides, disemicarbazides, sulphonyldihydrazides and diamine salts were ground in di(ethylhexyl) adipate or in tributoxyethyl phosphate or in N-methylpyrroli-don by a Dispermat pearl mill configuration for 1.5 hrs at 5000 rpm. The products which were ground were: carbodihydrazide, oxalic dihydrazide, succinic dihydrazide, adipic dihydrazide, sebacic dihydrazide, dodecanoic dihydrazide, isophtalic dihydrazide, the products of example 10, 11, 12 and 13, 4,4'-oxybis (benzenesulphonylhydrazide), guanidine hydrochloride, lysine.

In all cases the particle sizes of the hydrogen reactive materials in the dispersions were measured by microscopy. The ranges in di(ethylhexyl) adipate were comparable and were between 30 and 60 μm. The values in tributoxyethyl phosphate or in N-methylpyrrolidon were slightly less and were 10–30 μm.

Example 17

Kinetics of the curing of the prepolymers of example 1, 2, 3 and 4 with adipic dihydrazide at several temperatures and times, measured by infrared spectroscopy.

The reaction of the prepolymers of example 1, 2, 3 and 4 with the adipic hydrazide dispersion of example 15 A (containing 5.716 meq of hydrazide/g) was followed at several temperatures by infrared spectroscopy. Further the potlife of the mixtures at 50° C. were controled.

50 gr of a polyurethane prepolymer of example 1, 2, 3, or 4 was mixed with a stoichiometric amount of the adipic dihydrazide dispersion and a film was prepared onto a sodium chloride cell. An Infrared spectrum was prepared which showed a large NCO signal at 2260 cm$^{-1}$. The cell was heated at 140, 160 or at 180° C. for several minutes and the decrease of the NCO-signal was measured by IR-spectroscopy. The results are presented in Table 3.

The results show that the IPDI-based prepolymers from example 1 and 2 are more reactive than the TDI-based prepolymers from example 3 and 4, which is indicated by a faster disappearance of the NCO-signal. There is not a significant difference in reactivity between the polyether and the polyester prepolymers.

Further the mixtures were stable for at least 6 weeks at 50° C. and at that moment the intensity of the signals of the NCO in the IR-spectrum were comparable with that of the freshly prepared mixtures.

TABLE 3 decrease of the NCO signal in the infrared spectrum during the curing reaction of isocyanate functional prepolymers of example 1, 2, 3 and 4 with an adipic acid dispersion in di(ethylhexyl) adipate

| Product of Example | Curing Temperature (° C.) | amount of remaining NCO (%) after[a] | | | |
|---|---|---|---|---|---|
| | | 4 min | 6 min | 9 min | 15 min |
| 1 | 140 | 19.0 | 5.7 | 2.5 | 1.2 |
| | 160 | 1.5 | 0.3 | 0 | 0.3 |
| 2 | 140 | 26.5 | 5.9 | 2.2 | 1.2 |
| | 160 | 1.2 | 0.1 | 0 | 0 |
| 3 | 140 | na | 78.9 | 55.9 | 49.6 |
| | 160 | na | 25.2 | 10.3 | 8.2 |
| | 180 | 17.4 | 9 | 5.5 | 2.2 |
| | 200 | 3.2 | 1.5 | 1.0 | 0.7 |
| 4 | 140 | na | 89.0 | 58.8 | 51.1 |
| | 160 | na | 49.7 | 11.5 | 8.5 |
| | 180 | 19.4 | 9.8 | 5.6 | 2.4 |
| | 200 | 5.4 | 2.7 | 1.5 | 1.2 |

Notes to table 3:
[a]determined by measuring the area of the signal at 2260–70 cm$^{-1}$ from the NCO-signal regarding to the carbonyl signal at 1740 cm$^{-1}$.
[b]na = not available

Example 18

Kinetics of the film formation by curing of the polurethane prepolymer of example 2 and 4 with adipic dihydrazide or carbodihydrazide at several temperatures and times.

50-gr of polyurethane prepolymer of example 2 (based on IPDI, which is an alifatic diisocyanate) or 4 (based on TDI, which is an aromatic diisocyanate) were mixed with an stoichiometric amount of the adipic dihydrazide dispersion of example 15 A or of the carbodihydrazide dispersion of example 16 and the mixtures were applied onto release paper. The curing of the films was checked at 120, 140 and at 160° C. at 1, 2, 3, 6 and 12 min. The results are presented in tabel 4. Both, aromatic and aliphatic prepolymers are completely reacted with the carbodihydrazide or with the adipic dihydrazide after 3 min. at 160° C. Regarding to example 17 the reaction is faster because the sodium chloride cell needs more time for warming up than release paper. When the film formation was complete flexible films were obtained.

TABLE 4

Film formation by curing of a polyurethane prepolymer of example 2 and 4 with adipic dihydrazide or carbodihydrazide at several temperatures and times

| polyurethane of example | hydrogen reactive material | curing temp. (° C.) | phase of the film[a] at a curing time of | | | | |
|---|---|---|---|---|---|---|---|
| | | | 1 min | 2 min | 3 min | 6 min | 12 min |
| 2 | adipic dihydrazide | 120 | w | w | w | t | r |
| | | 140 | t | r-i | r | r | r |
| | | 160 | r-i | r | r | r | r |
| 2 | carbodihydrazide | 120 | w | w | t | t | r |
| | | 140 | t | t | r-i | r | r |
| | | 160 | r-i | r | r | r | r |
| 4 | adipic dihydrazide | 140 | w | w | w | w | t |
| | | 160 | r-i | r | r | r | r |
| 4 | carbodihydrazide | 140 | r-i | r | r | r | r |
| | | 160 | r-i | r | r | r | r |

Notes to Table 4
[a]w: the mixture is still wet; no reaction is observed
t: the mixture is tacky; a partial reaction is effected
r-i: film formation is effected, but the film is not strong, which means that the reaction is incomplete
r: complete film formation is effected

Example 19

Preparation of films by curing a prepolymer of example 2 and adipic hydrazide powder or dispersion of example 14 and measurement of the homogenity of the films depending on the particle size of the adipic dihydrazide.

3.48 g (20 mmole) of ground adipic dihydrazide or 7.00 g (20 mmole) of an adipic dihydrazide dispersion in di(ethylhexyl)adipate of example 15 A was stirred into 50 g (containing 40 meq of NCO) of the prepolymer of example 2. Films of 200 μm were prepared onto a black coated glossy paper and heated for 3 min at 160° C. The gloss of the films was measured by a reflectometer. Further films of 200μ were prepared on transparant polyester sheets and the transparency of the films was determined by measuring the transmision by spectroscopy at 550 nm on a Hitachi model 101 spectrophoto-meter. The gloss and the transparancy of the films is a measure for the homogenity of the films The results of the tests are in table 5. It appeared that when the particle size of the adipic dihydrazide was small, the gloss and the transparency of the films were maximal.

TABLE 5

Homogeneity of cured films depending on the particle size of the adipic dihydrazide

| Adipic hydrazide grind originated from example | particle size of the adipic dihydrazide in the grind (μm) range | gloss of cured films of 200 μm | transmission of cured films of 200 μm (%) |
|---|---|---|---|
| 14 A | 30–300 | 7.8 | 52.2 |
| 14 B | 30–250 | 8.5 | 64.5 |
| 14 C | 40–150 | 27 | 85.0 |
| 14 D | 30–60 | 46 | 93.5 |
| 14 E | 5–40 | 60 | 94.6 |
| 14 F | 0.5–13 | 95 | 97.0 |

Example 20

Preparation of a film by curing a polyether polyurethane prepolymer and a adipic dihydrazide dispersion and comparing the film with the film of example 8 and of example 9.

9.28 g (26.5 mmole) of an adipic dihydrazide dispersion of example 15 A was stirred into 50 g (containing 53 meq of NCO) of the prepolymer of example 1. Films of 200 μm were prepared and reacted for 3 min at 160° C. The mechanical properties of the films were determined and compared to those of the films of the high solid systems of comparative examples 8 and 9. The results are shown in table 6.

The results show that regarding to the films of example 8 and 9 the maximal strength and elongation of the film of example 20 is much higher. The tensile strength at 100 and 200 MPa is much more than that of example 9 and comparable with that of example 8. Regarding to example 8 there is a further advantage that no butanone oxime is released.

TABLE 6 mechanical properties of the films of a polyether polyurethane cured with adipic di-hydrazide regarding to the films of example 8 and of example 9.

| Film of example | Mechanical properties (MPa)[a] | | | | | |
|---|---|---|---|---|---|---|
| | M-100 | M-200 | M-300 | M400 | UTS | Elongation |
| 8 | 2.6 | 3.8 | — | — | 4.7 | 260 |
| 9 | 0.6 | 1.2 | — | — | 1.3 | 220 |
| 20 | 2.8 | 4.4 | 5.8 | 7.7 | 7.6 | 405 | notes to table 6:
[a]MPa is megapascal ($10^6$ Nm$^{-2}$). The mechanical properties and the elongation are measured with films which were stretched at a thickness of 200 μm on a MTS Synergie 200 apparatus. The values at M-100, M-200, M-300 and M400 give tensile strengths of the films while stretching them for respectively 100, 200, 300 and 400%. The UTS is the ultimate tensile strength just before the film breaks. The elongation is the maximal elongation before the film breaks.

Example 21

Preparation of coatings on glass by curing a polyisocyanate and the adipic hydrazide dispersion of example 15A.

50 g of N,N',N"-tris(6-isocyanatohexyl)isocyanurate or of, N,N'-bis(6-isocyanato-hexyl-N-(6-isocyanato-hexylamido)urea was mixed with a stoichiometric amount of the adipic hydrazide dispersion of example 15A or of the carbodihydrazide dispersion of example 16. 200 μm films were prepared on glass and heated for 6 min is at 160° C. Hard coating surfaces were obtained with a good adhesion to the glass.

Example 22

Preparation of a film by curing a polyurethane prepolymer and a dispersion of a hydrogen reactive material of example 16.

50 g of the polyurethane prepolymer of example 2 was mixed with a stoichiometric amount of the dispersions of example 16 and the mixtures were applied onto release paper. The curing of the films was checked at 140 or 160° C. after 3 min and after 12 min. When no film formation was observed the curing was checked at 220 and 250° C. The results are presented in tabel 7.

The results show that the dihydrazides, disemicarbazides and some diamine salts react with a isocyanate functional polyurethane prepolymer to form a film. These films are flexible. The table further shows that the reactivity of the used dihydrazides is comparable with that of the sulphonyldihydrazide used and both are are more reactive than the semicarbazides used. The amine salts need a prolonged heating at higher temperatures before they react.

TABLE 7

Film formation by curing the polyurethane prepolymer of example 2 and a dihydrazide, disemicarbazide, and a diamine

| | phase of the film[a] at a curing temperature and time of | | | | | | |
|---|---|---|---|---|---|---|---|
| | 140° C. | | 160° C. | | 220° C. | | 250° C. |
| Hydrogen reactive material | 3 min | 12 min | 3 min | 12 min | 3 min | 12 min | 3 min |
| carbodihydrazide | r-i | r | r | r | — | — | — |
| oxalic dihydrazide | t | r | r | r | — | — | — |
| succinic dihydrazide | t | r | r | r | — | — | — |
| adipic dihydrazide | r | r | r | r | — | — | — |
| sebacic dihydrazide | r | r | r | r | — | — | — |
| dodecanoic dihydrazide | r | r | r | r | — | — | — |
| isophtaltic dihydrazide | r | r | r | r | — | — | — |
| 4,4,-methylenebis-(cyclohexylisemi-carbazide) | w | w | w | t | r | — | — |
| hexamethylene disemicarbazide | w | w | t | r | r | — | — |
| tolyldiaemicarbazide | w | w | w | t | r | — | — |
| 3-semicarbazido-methyl-3,5,5-trimethylcyclo-hexylsemi-carbazide | w | w | w | r-i | r | — | — |
| 4,4'-oxybis-(benzenesulphonyl-hydrazide) | r | r | r | r | — | — | — |
| guanidine-hydrochloride | w | w | w | w | w | r | r-i |
| lysine | w | w | w | w | t | r | r-i |

Notes to Table 7
[a]w: the mixture is still wet; no reaction is observed
t: the mixture is tacky; a partial reaction is effected
r-i: film formation is effected, but the film is not strong, which means that the reaction is incomplete
r: complete film formation is effected Example 23

Preparation of a film by curing a polyepoxide and a adipic dihydrazide or a carbodihydrazide dispersion 50 g (138.7 mmole) of Tetrad-X, which is a polyepoxide material obtainable from Mitsubishi, was mixed with a stoichiometric amount of the adipic hydrazide dispersion of example 15 A or the carbodihydrazide of example 16. The products were applied onto release paper and heated at 140 and at 160° C. The mixtures were cured after 6 min at 160° C. or after 3 min at 180° C. Brittle films were obtained.

Example 24

Preparation of a film by curing a poly ketone functional compound and a adipic dihydrazide dispersion or a carbohydrazide dispersion.

The products of example 5, 6 and 7 and a mixture 20% of example 7+80% of example 5 were mixed with a stoichiomeric amount of the adipic dihydrazide dispersion of example 15 A or with the carbodihydrazide dispersion of example 16. The products were applied onto release paper. The films were cured at 160° C. during 3 min. The film formation was complete. The films of the cured product of examples 5 and 6 were very soft, sticky and flexible. The film of the cured mixture was flexible and the film of the cured product of example 7 was very hard.

Example 25

Preparation of a film by curing a polyanhydride functional compound and a adipic dihydrazide dispersion. 20 gr of the styrene/anhydride copolymers, known as SMA 1000, SMA-2000 and SMA 3000 obtainable from Elf Atochem were mixed with 8 g of 1-methoxy-propanol at 80° C. until the mixtures were dissolved. The solutions were cooled down and mixed with a stoichiometric amount of the adipic dihydrazide dispersion of example 15 A or with the carbohydrazide dispersion of example 16 and applied onto glass or onto release paper. The mixtures were cured at 160° C. for 6 min onto glass or for 4 min onto release paper. The coatings obtained were extremely hard and brittle.

Example 26

Preparation of a coated textile to be used as synthetic leather.

A coated textile was prepared by direct coating comprising:

Preparation of an adhesion coat onto textile: 150 µm of a mixture of 100 g RU-4049, 0.7 g of RM-4456, 5.0 g of XR-S580 and 5 g water (products obtainable from Stahl Holland) was applied onto textile by knife over roll and the coated textile was dried for 3 min at 80° C.

Preparation of a coat from a solvent free material onto the thus obtained coated textile: 400µ of a mixture of 100 g of the product of Example 1 and 21 g of the adipic hydrazide dispersion of example 15 A was applied onto the coated textile. The coating was cured in an oven at 1600 for 3 min.

The coating was embossed at 190° C.

Example 27

Preparation of a double sided coated textile which may be used as synthetic leather.

A double sided coated textile was prepared by direct coating by repeating the procedure of example 26 onto the other side of the textile.

Example 28

Preparation of a coated textile to be used as synthetic leather by transfer coating.

A coated textile was prepared by transfer coating comprising:

Preparation of a topcoat onto release paper: 150 µm of a 1:1 mixture of RU-3952 and RU3953 (both are aqueous polyurethane dispersions obtainable from Stahl Holland) containing 10% of PP-3215 (a black pigment obtainable from Stahl Holland) was applied onto release paper by knife over roll and the coated paper was dried at 80° C. for 3 min.

Preparation of an intermediate coat from a solvent free material onto the coated release paper: 400 µm of a mixture of 100 g of the product of Example 1 and 21 g of the adipic hydrazide dispersion of example 15 A was applied onto the topcoat. The coating on the paper was cured in an oven at 160° C. for 3 min.

Preparation of an adhesive coat onto the obtained intermediate coat: 150 µm of SU-6241 (which is a solvent based polyurethane obtainable from Stahl Holland) containing 5% of XR-8041 (which is a crosslinker obtainable from Stahl Holland) was applied onto the intermediate coat.

A piece of textile was laminated into the adhesive and the thus obtained material was dried at 120° C. for 2 min.

The release paper was removed from the thus coated textile.

Example 29

Preparation of a coated materials by transfer coating.

The procedure of example 28 was repeated with the exception that the textile was replaced by leather, nonwoven or a coagulated polyurethane substrate.

Example 30

Preparation of a coated polyvinylchloride to be used as synthetic leather by transfer coating.

Preparation of a skincoat onto release paper: 150 µm of EX-51-550 (a solvent based polyurethane dispersions obtainable from Stahl Holland) was applied onto release paper by knife over roll and the coated paper was dried at 80° C. for 3 min.

Preparation of a coat from a high solids material onto the coated release paper: 400 µm of a mixture of 100 g of the product of Example 2 and 17 g of the adipic hydrazide dispersion of example 15 A was applied onto the topcoat. The coating on the paper was cured in an oven at 1600 for 3 min.

Preparation of a compact polyvinylchloride substrate onto the high solids coat: 400 µm of a polyvinylchloride paste was applied onto the high-solids coat.

a piece of textile was laminated in the polyvinyl chloride paste and the polyvinyl chloride was cured by 2 min at 160° C. followed by 1 min at 220° C.

the release paper was removed from the thus coated polyvinylchloride on textile.

Example 31

Preparation of a moulded material by inmould coating.

A mixture of 100 g of example 2, 20 g of N,N',N"-tris (6-isocyanatohexyl)isocyanurate and 37 g of the adipic hydrazide dispersion of example 15 A was diluted with 50 g of butylacetate and heated to 50° C. while mixing. The mixture was sprayed into a metalic matrix until a coating of about 400 µm was obtained; the matrix was pretreated with a silicon and was heated at 180° C. during the spray process. The matrix was cooled down and the moulded material was removed.

What is claimed is:

1. A process for the preparation of a coating, adhesive, film or sheet wherein a mixture of a polyisocyanate functional, a polyepoxide functional, a polyanhydride functional or a polyketone functional compound or polymer and a dispersion of a compound containing reactive hydrogen, which compound is a polyhydrazide, a polysemicarbazide, or a polysulphonylhydrazide, in a material which contains no groups which are reactive toward the compound containing reactive hydrogen, in which mixture the reactivities of the isocyanate, epoxide, anhydride or the ketone functions towards the hydrazide, semicarbazide, or sulphonylhydrazide is absent or low at ambient conditions and the reactivities are high at temperatures of 50 to 300° C., is applied onto a substrate at ambient temperature, followed by reacting the above compounds at 50 to 300° C. for 1 to 10 min, or is applied onto a substrate at ambient temperature, followed by immersing the coated substrate into water of 20 to 100° C. for 1 to 10 min, so that the mixture cures completely.

2. The process according to claim 1, wherein at ambient temperature said compound containing reactive hydrogen is a solid material, a powder, a granule, a flake or grind or a mixture thereof.

3. The process according to claim 2 wherein size of the grind of said compound containing reactive hydrogen is from 0.5 to 200 μm.

4. The process according to claim 1, wherein said polyhydrazide is selected from the group consisting of oxalic dihydrazide, malonic dinydrazide, succinic dinydrazide, adipic dihydrazide, sebacic dihydrazide, dodecanoic dihydrazide, isophthalic dihydrazide, piperazine N,N'-dihydrazide, m-benzene-dihydrazide, and p-benzene-dihydrazide.

5. The process according to claim 1, wherein said polyhydrazide comprises adipic dihydrazide.

6. The process according to claim 1, wherein said polysemicarbazide is selected from the group consisting of ethane-disemicarbazide, butane-disemicarbazide, propane-disemicarbazide, hexane-disemicarbazide, para-benzene-disemicarbazide, tuluene-2,4-disemicarbazide, tuluene-2,4-disemicarbazide, bis (4-semicarbazido-phenyl)ether, bis (4,4'-hydrozide)-3,3'-dimethoxy biphenyl, di-N,N'-methylamino urea, 4,4'-methylene-bis (cyclohexene semicarbazide), 3-semicarbazidemethyl-3,5,5-trimethylcyclohexyl-semicarbazide and mixtures thereof.

7. The process according to claim 1, wherein said polysulphonyl hydrazide is selected from the group consisting of p,p'-oxybis benzene sulphonyl hydrazide, bis (methylhydrazido)sulphate, bis (methylhydrazidosulphonyl) piperazine, and bis p-(hydrazidosulphonylamino)benzene.

8. The process according to claim 1, wherein the material which contains no groups which are reactive towards the compound containing reactive hydrogen, is a polyether, a polyester, a polycarbonate, a polyacrylate, a polyvinylalkylether, a polyurethane, a polyacrylate, a polyvinylalkylether, or a polyurethane.

9. The process according to claim 1, wherein said mixture of the polyisocyanate functional, the polyepoxy functional, or the polyketone functional compound or polymer and the compound containing reactive hydrogen, is solvent free.

10. The process according to claim 1, wherein said polyisocyanate functional compound or polymer and said compound containing reactive hydrogen are mixed together in an equivalent ratio of 0.5 to 1.5, applied onto a substrate and the so obtained covered or impregnated substrate is heated to a temperature of 50 to 300° C. for 1 to 10 min.

11. The process according to claim 1, wherein said polyisocyanate functional compound or polymer and said compound containing reactive hydrogen are mixed together in an equivalent ratio of 0.5 to 1.5, and applied onto a substrate whereafter the covered or impregnated substrate is immersed into water of 20 to 100° C. for 1 to 10 min.

12. Coatings, coated substrates, adhesives, films, sheets, impregnated substrates, synthetic leathers, in mold coatings, coated leathers, coated polyvinylchlorides, coated nonwovens, coated coagulated polyurethane substrates, and breathable coated substrates, obtained by applying the process of claim 1.

13. A coating mixture to be applied in the process of claim 1 wherein the coating mixture comprises a mixture of a polyisocyanate functional, a polyepoxyde functional, a polyanhydride functional or a polyketone functional compound and a dispersion of a compound containing reactive hydrogen, which compound is a polydydrazide, a polysemicarbazide, or a polysulphonylhydrazide, in a material which contains no groups which are reactive towards the compound containing reactive hydrogen, in which mixture the reactivities of the isocyanate, epoxide, anhydride or the ketone functions towards the hydrazide or semicarbazide sulphonylhydrazide is absent or low at ambient conditions and the reactivities are high at temperatures of 50 to 300° C. or when the mixture is immersed into water.

14. A coating mixture according to claim 1, wherein the mixture of the polyisocyanate functional compound, the polyepoxide functional compound, the polyanhydride functional compound or the polyketone functional compound or polymers thereof and the compound containing reactive hydrogen is stable at ambient temperature for at least one day.

15. A coating mixture according to claim 13, wherein the mixture of the polyepoxide functional compound, the polyanhydride functional compound or the polyketone functional compound or polymers thereof and the compound containing reactive hydrogen is stable at ambient temperature as a one pot system.

16. A coating mixture according to claim 13, wherein the compound containing reactive hydrogen is present as grind which is dispersed in a material which is non-reactive towards the material containing reactive hydrogen.

17. A coating mixture according to claim 13, wherein at ambient temperature the compound containing reactive hydrogen is a solid, which is a powder, a granule, a flake or a grind or a mixture thereof.

18. A coating mixture according to claim 17, wherein particle size of the grind or of the dispersion of the compound containing reactive hydrogen is from 0.5 to 200 μm.

* * * * *